United States Patent
Noh et al.

(10) Patent No.: US 11,431,438 B2
(45) Date of Patent: Aug. 30, 2022

(54) METHOD AND APPARATUS FOR TRANSMITTING OR RECEIVING CHANNEL INFORMATION IN WIRELESS COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Hoon-dong Noh, Gyeonggi-do (KR); Seong-mok Lim, Seoul (KR); Youn-sun Kim, Gyeonggi-do (KR); Young-woo Kwak, Gyeonggi-do (KR); Sang-geun Lee, Seoul (KR); Chung-yong Lee, Seoul (KR)

(73) Assignees: Samsung Electronics Co., Ltd; Industry-Academic Cooperation Foundation, Yonsei University

( * ) Notice: Subject to any disclaimer, the term of this patent is extended or adjusted under 35 U.S.C. 154(b) by 17 days.

(21) Appl. No.: 16/651,205

(22) PCT Filed: Sep. 28, 2018

(86) PCT No.: PCT/KR2018/011590
§ 371 (c)(1),
(2) Date: Mar. 26, 2020

(87) PCT Pub. No.: WO2019/066589
PCT Pub. Date: Apr. 4, 2019

(65) Prior Publication Data
US 2020/0244392 A1    Jul. 30, 2020

(30) Foreign Application Priority Data
Sep. 28, 2017 (KR) .......................... 10-2017-0126359

(51) Int. Cl.
*H04L 1/00* (2006.01)
*H04B 7/06* (2006.01)
(Continued)

(52) U.S. Cl.
CPC ......... *H04L 1/0026* (2013.01); *H04B 7/0626* (2013.01); *H04L 5/0048* (2013.01); *H04W 24/10* (2013.01)

(58) Field of Classification Search
None
See application file for complete search history.

(56) References Cited

U.S. PATENT DOCUMENTS 10,455,551 B2    10/2019    Jang et al.
2017/0170889 A1    6/2017    Kim et al.

FOREIGN PATENT DOCUMENTS

KR    1020180050015    5/2018
WO    WO-2008115111 A1 *    9/2008    ........... H04L 1/0026

OTHER PUBLICATIONS

On link adaption enhancements to support URLLC, herein Intel (Year: 2017).*

(Continued)

*Primary Examiner* — Ayanah S George
(74) *Attorney, Agent, or Firm* — The Farrell Law Firm, P.C.

(57) ABSTRACT

Provided are a method and apparatus for transmitting and receiving channel information in a wireless communication system. The method for transmitting and receiving channel information in a wireless communication system includes: receiving information about a channel information providing method from a base station; receiving, from the base station, a reference signal for measuring a channel status between the base station and the terminal; determining channel information for a plurality of services, based on the (Continued)

information about the channel information providing method and the reference signal; and transmitting, to the base station, the channel information for the plurality of services.

13 Claims, 12 Drawing Sheets

(51) Int. Cl.
*H04W 24/10* (2009.01)
*H04L 5/00* (2006.01)

(56) References Cited

OTHER PUBLICATIONS

CSI measuring and reporting procedure for URLLC, herein Nokia. (Year: 2017).*
"Link Adaptation and CSI reporting for URLLC transmission", herein Huawei. (Year: 2017).*
"Discussions on service specific CSI for NR", herein Samsung (Year: 2017).*
Intel Corporation, "On Link Adaptation Enhancements to Support URLLC", R1-1716326, 3GPP TSG RAN WG1 Meeting NR#3, Sep. 18-21, 2017, 5 pages.
Nokia et al., "CSI Measuring and Reporting Procedure for URLLC", R1-1715551, 3GPP TSG RAN WG1 NR AH #3, Sep. 18-21, 2017, 6 pages.
Huawei et al., "Link Adaption and CSI Reporting for URLLC Transmission", R1-1715414, 3GPP TSG RAN WG1 Meeting NR#3, Sep. 18-21, 2017, 10 pages.
Samsung, "Discussions on Service Specific CSI for NR", R1-1715946, 3GPP TSG RAN WG1 Meeting NR#3, Sep. 18-21, 2017, 4 pages.
International Search Report dated Jan. 9, 2019 issued in counterpart application No. PCT/KR2018/011590, 23 pages.
Korean Office Action dated Apr. 21, 2022 issued in counterpart application No. 10-2017-0126359, 7 pages.

* cited by examiner

FIG. 8

| CQI | Modulation | Efficiency |
|---|---|---|
| 0 | Out of range | |
| 1 | QPSK | 0.1523 |
| 2 | QPSK | 0.2344 |
| 3 | QPSK | 0.3770 |
| 4 | QPSK | 0.6016 |
| 5 | QPSK | 0.8770 |
| 6 | QPSK | 1.1758 |
| 7 | 16QAM | 1.4766 |
| 8 | 16QAM | 1.9141 |
| 9 | 16QAM | 2.4063 |
| 10 | 64QAM | 2.7305 |
| 11 | 64QAM | 3.3223 |
| 12 | 64QAM | 3.9023 |
| 13 | 64QAM | 4.5234 |
| 14 | 64QAM | 5.1152 |
| 15 | 64QAM | 5.5547 |

800

| CQI | Modulation | Efficiency |
|---|---|---|
| 0 | Out of range | |
| 1 | QPSK | $\alpha_1$ |
| 2 | QPSK | $\alpha_2$ |
| 3 | QPSK | $\alpha_3$ |
| 4 | 16QAM | $\alpha_4$ |
| 5 | 16QAM | $\alpha_5$ |
| 6 | 16QAM | $\alpha_6$ |
| 7 | 16QAM | $\alpha_7$ |

| $N_{PRB}$ \ $I_{TBS}$ | ... | 21 | 22 | 23 | ... |
|---|---|---|---|---|---|
| ⋮ | | ⋮ | ⋮ | ⋮ | |
| 10 | ... | 3752 | 3880 | 4008 | ... |
| 11 | ... | 4264 | 4392 | 4584 | ... |
| 12 | ... | 4776 | 4968 | 5352 | ... |
| ⋮ | | ⋮ | ⋮ | ⋮ | |

900

| $N_{PRB}$ \ $I_{TBS}$ | ... | 21 | 22 | 23 | ... |
|---|---|---|---|---|---|
| ⋮ | | ⋮ | ⋮ | ⋮ | |
| 10 | ... | α(10,21) | α(10,22) | α(10,23) | ... |
| 11 | ... | α(11,21) | α(11,22) | α(11,23) | ... |
| 12 | ... | α(12,21) | α(12,22) | α(12,23) | ... |
| ⋮ | | ⋮ | ⋮ | ⋮ | |

Table 1000:

| CQI index | Modulation | Efficiency | Type | | |
|---|---|---|---|---|---|
| 0 | Out of range | | | | |
| 1~2 | QPSK | $\alpha_1 \sim \alpha_2$ | 1 | | |
| 3 | QPSK | $\alpha_3$ | 1 | | |
| 4~6 | QPSK | $\alpha_4 \sim \alpha_6$ | 1 | 2 | |
| 7 | QPSK | $\alpha_7$ | 1 | 2 | |
| 8~10 | 16QAM | $\alpha_8 \sim \alpha_{10}$ | | 2 | |
| 11~14 | 16QAM | $\alpha_{11} \sim \alpha_{14}$ | 1 | 2 | |
| 15~16 | 16QAM | $\alpha_{15} \sim \alpha_{16}$ | | 2 | |
| 17~19 | 16QAM | $\alpha_{17} \sim \alpha_{19}$ | | 2 | 3 |
| 20~24 | 64QAM | $\alpha_{20} \sim \alpha_{24}$ | | 2 | 3 |
| 25~27 | 64QAM | $\alpha_{25} \sim \alpha_{27}$ | | 2 | 3 |
| 28~31 | 64QAM | $\alpha_{28} \sim \alpha_{31}$ | | | 3 |

FIRST TYPE SERVICE →

Table 1010:

| CQI index | Subset CQI index | Modulation | Efficiency |
|---|---|---|---|
| 0 | 0 | Out of range | |
| 1~3 | 1~3 | QPSK | $\alpha_1 \sim \alpha_3$ |
| 11~14 | 4~7 | 16QAM | $\alpha_{11} \sim \alpha_{14}$ |

SECOND TYPE SERVICE →

Table 1020:

| CQI index | Subset CQI index | Modulation | Efficiency |
|---|---|---|---|
| 0 | 0 | Out of range | |
| 3~7 | 1~5 | QPSK | $\alpha_3 \sim \alpha_7$ |
| 15~16 | 6~7 | 16QAM | $\alpha_{15} \sim \alpha_{16}$ |
| 20~27 | 8~15 | 64QAM | $\alpha_{20} \sim \alpha_{27}$ |

METHOD AND APPARATUS FOR TRANSMITTING OR RECEIVING CHANNEL INFORMATION IN WIRELESS COMMUNICATION SYSTEM

PRIORITY

This application is a National Phase Entry of PCT International Application No. PCT/KR2018/011590 which was filed on Sep. 28, 2018, and claims priority to Korean Patent Application No. 10-2017-0126359, which was filed on Sep. 28, 2017, the content of each of which is incorporated herein by reference.

TECHNICAL FIELD

The present disclosure relates to a wireless communication system, and more particularly, to a method of transmitting and receiving channel information indicating a channel status between a base station and a terminal.

BACKGROUND ART

To meet the increase in demand for wireless data traffic after the commercialization of $4^{th}$ generation (4G) communication systems, considerable efforts have been made to develop improved 5G communication systems (or new radio (NR)) or pre-$5^{th}$ generation (5G) communication systems. This is one reason why '5G communication systems' or 'pre-5G communication systems' are called 'beyond 4G network communication systems' or 'post Long-Term Evolution (LTE) systems.'

The 5G communication systems consider resources regarding various services compared to existing 4G communication systems. For example, the 5G communication systems may support various services, such as enhanced mobile broadband (eMBB), ultra-reliable and low latency communication (URLLC), and massive machine type communication (mMTC). However, targets set for the plurality of services are different and requirements that meet the targets set for each service are different. Thus, it is important to support each service while satisfying the requirements of each service.

DESCRIPTION OF EMBODIMENTS

Technical Problem

Disclosed embodiments provide a method and apparatus for transmitting and receiving channel information for effectively supporting a plurality of services, when the plurality of services having different types are supported in a wireless communication system.

Disclosed embodiments provide a method and apparatus for transmitting and receiving channel information for each service, when a terminal is operated in a plurality of services having different types.

Disclosed embodiments provide a method and apparatus for transmitting and receiving channel information capable of satisfying a performance requirement required by each service by transmitting and receiving channel information for each service, when a plurality of services having different performance requirements are supported in a wireless communication system.

Solution to Problem

A method, performed by a terminal, of transmitting and receiving channel information in a wireless communication system is provided, and the method may include: receiving information about a channel information providing method from a base station; receiving, from the base station, a reference signal for measuring a channel status between the base station and the terminal; determining channel information for a plurality of services, based on the information about the channel information providing method and the reference signal; and transmitting, to the base station, the channel information for the plurality of services.

Advantageous Effects of Disclosure

According to disclosed embodiments, a terminal can effectively support a plurality of services by transmitting and receiving channel information for the plurality of services having different types.

According to disclosed embodiments, a base station can determine a channel status more suitable for each service by transmitting and receiving channel information for a plurality of services.

BRIEF DESCRIPTION OF DRAWINGS

FIG. 8 is a diagram for describing a CQI table for each service, according to an embodiment.

FIG. 9 is a diagram for describing a method of differently configuring a size of a transport block for each service, according to an embodiment.

FIG. 10 is a diagram for describing a method of using an integrated CQI table, according to an embodiment.

BEST MODE

Figure 1:
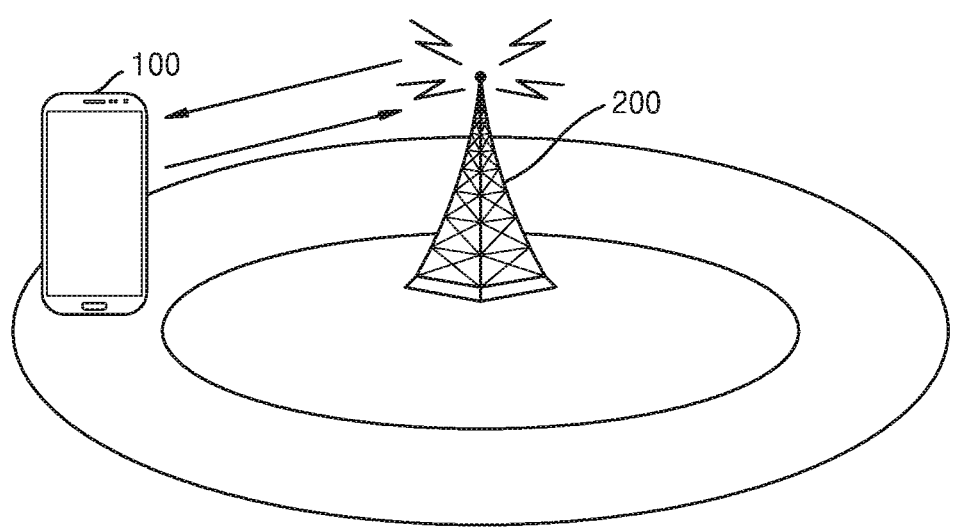
FIG. 1 is a diagram showing a wireless communication system according to an embodiment.

According to an embodiment, a method, performed by a terminal, of transmitting and receiving channel information in a wireless communication system, the method includes: receiving information about a channel information providing method from a base station; receiving, from the base station, a reference signal for measuring a channel status between the base station and the terminal; determining channel information for a plurality of services, based on the information about the channel information providing method and the reference signal; and transmitting, to the base station, the channel information for the plurality of services.

The determining of the channel information for the plurality of services may include: determining a channel quality indicator (CQI) for a first type service and a CQI for a second type service among the plurality of services, based on a CQI table; and determining a differential CQI indicating a difference between the CQI for the first type service and the CQI for the second type service, wherein the transmitting of the channel information for the plurality of services may include transmitting the CQI for the first type service and the differential COI to the base station.

The determining of the channel information for the plurality of services may include: extracting a plurality of CQI subset tables including a CQI index for each service, based on a CQI table including CQI indexes for the plurality of services; and configuring a CQI subset index for each service, based on the extracted plurality of CQI subset tables, wherein the transmitting of the channel information for the plurality of services may include transmitting the CQI subset index for each service to the base station.

The determining of the channel information for the plurality of services may include determining CQIs for the plurality of services, based on a configured CQI table.

The transmitting of the channel information for the plurality of services may include transmitting, to the base station, service identification information for identifying a service corresponding to each piece of channel information.

The plurality of services may include a first service and a second service, the determining of the channel information for the plurality of services may include, when the second service is a service requiring higher reliability than the first service, configuring a rank value for the second service to be equal to or smaller than a preconfigured value, based on a CQI for the second service, and the transmitting of the channel information for the plurality of services may include transmitting, to the base station, the CQI for the second service and rank information of the second service as channel information for the second service.

According to an embodiment, a method, performed by a base station, of transmitting and receiving channel information in a wireless communication system, the method includes: transmitting information about a channel information providing method to a terminal; transmitting, to the terminal, a reference signal for measuring a channel status between the base station and the terminal; receiving, from the terminal, channel information for a plurality of services determined based on the information about the channel information providing method and the reference signal; and determining a channel status between the base station and the terminal, based on the received channel information for the plurality of services.

The plurality of services may include a first type service and a second type service, and the channel information for the plurality of services may include a channel quality indicator (CQI) for the first type service determined based on a CQI table, a CQI for the second type service, and a differential CQI indicating a difference between the CQI for the first type service and the CQI for the second type service.

The channel information for the plurality of services may be determined based on a configured CQI table.

The receiving of the channel information for the plurality of services may include receiving, from the terminal, service identification information for identifying a service corresponding to each piece of channel information.

According to an embodiment, a terminal for transmitting and receiving channel information in a wireless communication system, the terminal includes: a transceiver configured to receive, from a base station, information about a channel information providing method and receive, from the base station, a reference signal for measuring a channel status between the base station and the terminal; a memory storing the information about the channel information providing method; and at least one processor configured to determine channel information for a plurality of services, based on the information about the channel information providing method and the reference signal, wherein the transceiver is further configured to transmit, to the base station, the channel information for the plurality of services.

According to an embodiment, a base station for transmitting and receiving channel information in a wireless communication system, the base station includes: a memory storing information about a channel information providing method; a transceiver configured to transmit, to a terminal, the information about the channel information providing method and a reference signal for measuring a channel status between the base station and the terminal, and receive, from the terminal, channel information for a plurality of services determined based on the information about the channel information providing method and the reference signal; and at least one processor configured to determine the channel status between the base station and the terminal, based on the received channel information.

Mode of Disclosure

Hereinafter, embodiments of the present disclosure will be described in detail with reference to the accompanying drawings such that one of ordinary skill in the art may easily implement the present disclosure. However, the present disclosure may be implemented in various different forms and is not limited to the embodiments described herein. Also, in the drawings, parts irrelevant to the description are omitted in order to clearly describe the present disclosure, and like reference numerals designate like elements throughout the specification.

Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

It will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Hereinafter, embodiments of the present disclosure will be described with reference to accompanying drawings.

FIG. 1 is a diagram showing a wireless communication system according to an embodiment.

In a 5th generation (5G) communication system or a new radio (NR), at least one service among a plurality of services including an enhanced mobile broadband (eMBB) service, an ultra reliable low latency communication (URLLC) service, and a massive machine type communication (mMTC) service may be provided to a terminal. Here, because targets set for the services are different, performance requirements that meet the targets of the services may also be different.

For example, the eMBB service is a service supporting a large amount of traffic. In the eMBB service, because the large amount of traffic is transmitted during a determined transmission time interval (TTI), a relatively high data rate is required.

However, in the case of some services supported in the 5G communication system, reliability higher than the high data rate may be required. For example, the URLLC service needs to satisfy a high $10^{-5}$ block error rate (BLER) higher than a $10^{-1}$ BLER that is a reliability requirement of existing long-term evolution (LTE). The URLLC service requires high reliability and low latency conditions, and the mMTC service requires a condition such as increased connectivity and coverage to connect a plurality of apparatuses.

As described above, the URLLC service is a service requiring high reliability and low latency and traffic of the URLLC occurs sporadically compared to traffic of the eMBB service. The reliability required by the URLLC service should have BLER performance of $10^{-5}$ and a latency of 0.5 ms or less.

To satisfy the low latency condition of the URLLC service, a transmission method using a shortened TTI and subcarrier spacing (SCS) equal to or greater than 15 kHz may be used. Unlike a method of configuring 14 orthogonal frequency division multiplex (OFDM) symbols (OSs) and 12 subcarriers as one subframe, the method using a shortened TTI is a method for reducing a transmission time during one TTI by configuring the number of OSs arranged in one subframe to 7, 3+4, or 2.

Also, in addition to using a shortened TTI (sTTI), the URLLC service may be supported by expanding the existing SCS of 15 kHz to 30 kHz or 60 kHz. When the SCS is expanded, an area in a frequency domain occupied by a resource is increased, but the length in a time domain is decreased, and thus the low latency condition may be satisfied.

Referring to FIG. 1, a terminal 100 and a base station 200 may exchange data by using a wireless channel, and a method for improving transmission efficiency is required to transmit and receive a large amount of data by using the wireless channel that is a limited resource. The transmission efficiency varies based on a channel status between the terminal 100 and the base station 200, and the channel status may change in real-time. Also, because a data rate and reliability may vary based on the channel status, the channel status between the terminal 100 and the base station 200 needs to be measured. In this regard, the base station 200 may transmit a reference signal (RS) for measuring the channel status to the terminal 100, and the terminal 100 may measure the channel status based on the received RS and transmit channel information indicating the measured channel status to the base station 200.

The base station 200 may determine the channel status between the terminal 100 and the base station 200, based on the channel information received from the terminal 100 and perform scheduling based on the determined channel status, thereby efficiently using a wireless channel.

Meanwhile, as described above, in the 5G communication system supporting the plurality of services, the performance requirements may vary according to the supported services, and for one terminal 100 to operate in different types of services, channel information for each type of service is required.

Figure 2:
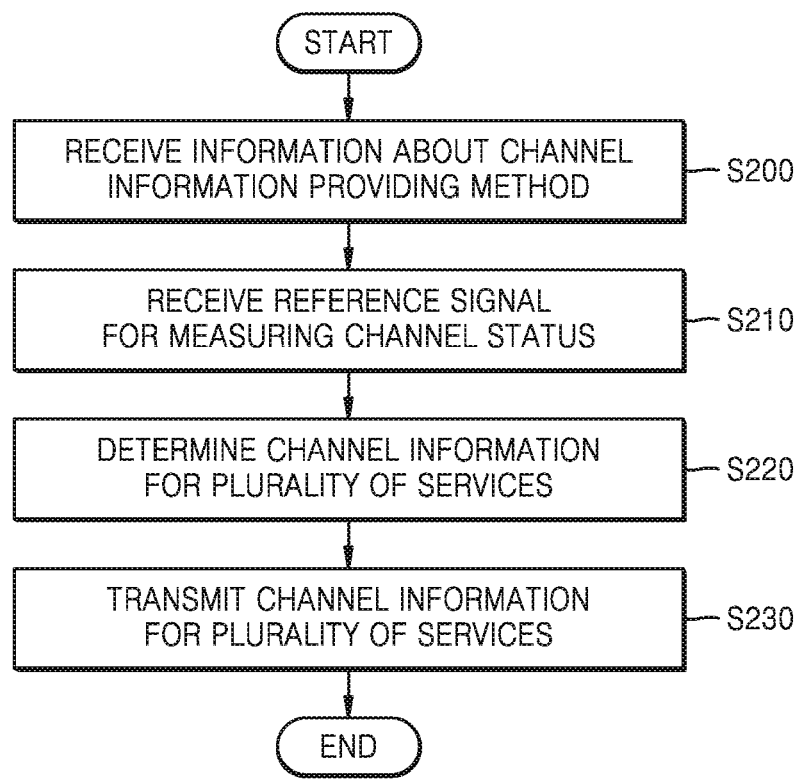
FIG. 2 is a flowchart for describing a method, performed by a terminal, of transmitting channel information to a base station, according to an embodiment.

FIG. 2 is a flowchart for describing a method, performed by a terminal, of transmitting channel information to a base station, according to an embodiment.

In operation S200, the terminal 100 may receive information about a channel information providing method from the base station 200.

The terminal 100 according to an embodiment may receive, from the base station 200, information about a method of determining channel information for a plurality of services and a method of transmitting the determined channel information to the base station 200. For example, the terminal 100 may receive, from the base station 200, at least one of information about whether to transmit the channel information for the plurality of services at a same time point and whether to transmit the channel information for the plurality of services at a same cycle. Also, the terminal 100 may receive, from the base station 200, at least one of information about whether to transmit all pieces of channel information for the plurality of services, whether to transmit only channel information for a reference service, and whether to transmit a differential channel quality indicator (CQI) for a service other than a CQI for the reference service, but is not limited thereto. The information about the channel information providing method received from the base station 200 may be pre-stored in the terminal 100.

In operation S210, the terminal 100 may receive, from the base station 200, a reference signal for measuring a channel status between the base station 200 and the terminal 100.

The reference signal according to an embodiment may be one of a cell-specific reference signal (CRS) or a channel status information reference signal (CSI-RS), but is not limited thereto. According to an embodiment, the reference signal may be a reference signal newly defined in a new radio-multiple input multiple output (NR-MIMO) system.

In operation S220, the terminal 100 may determine the channel information for the plurality of services, based on the information about the channel information providing method and the reference signal.

The channel information may be referred to as a CSI according to an embodiment, and may include a CQI, a preceding matrix indicator (PMI), and a rank indicator (RI).

The terminal 100 according to an embodiment may determine the CQI based on the reference signal and a pre-stored CQI table. For example, the terminal 100 may determine the CQIs for the plurality of services, based on a CQI table configured for each of the plurality of services.

The terminal 100 according to an embodiment may determine the CQI for the reference service and a CQI for a service other than the reference service, based on one pre-stored CQI table, and generate a differential CQI based on a difference between the CQI for the reference service and the CQI for the other service.

According to another embodiment, the terminal 100 may extract a plurality of CQI subset tables including a CQI index for each service, based on one CQI table including CQI indexes for the plurality of services, Here, the plurality of CQI subset tables may be pre-extracted and pre-stored in the terminal 100?. Also, the terminal 100 may configured a CQI subset index for each service, based on the extracted CQI subset table.

The CQI subset index may denote an index reconfigured for a CQI index filtered for each service from one CQI table including the CQI indexes for the plurality of services.

In operation S230, the terminal 100 may transmit the channel information for the plurality of services to the base station 200.

The terminal 100 according to an embodiment may transmit all pieces of channel information for all supportable types of services to the base station 200 to quickly react to a switch to another type of service. However, because overhead due to transmission of channel information increases based on the number of supportable services, a method for reducing the overhead caused by the transmission of the channel information may be required.

Also, according to an embodiment, the terminal 100 may transmit, to the base station 200, only the channel information of the reference service by using a relationship between different types of services. Here, when a service is changed from the reference service to the other type of service, the base station 200 may estimate channel information for a changed second type service based on channel information for a first type service received from the terminal 100. To estimate the channel information for the second type of service based on the channel information for the first type service, a relationship between pieces of channel information for services need to be defined. Then, the base station 200 may estimate the channel information for the second type service from the channel information for the first type service by using the relationship between the pieces of channel information of the services. Overhead caused by additional transmission and reception of channel information may be small, but performance deterioration may occur because the estimated channel information is used.

Also, the terminal 100 may transmit the differential COI for the service other than the CQI for the reference service, but an embodiment is not limited thereto.

The terminal 100 according to an embodiment may satisfy a performance required by different types of services while effectively supporting the plurality of services, by transmitting the channel information for the plurality of services to the base station 200.

Figure 3:
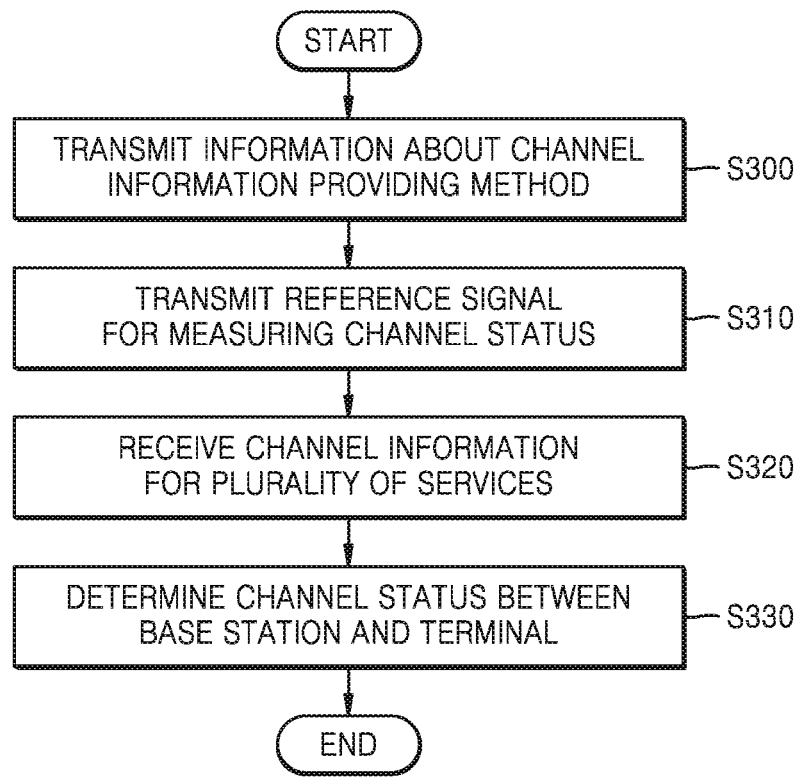
FIG. 3 is a flowchart for describing a method, performed by a base station, of determining a channel status, based on channel information received from a terminal, according to an embodiment.

FIG. 3 is a flowchart of a method, performed by a base station, of receiving channel information from a terminal, according to an embodiment.

In operation S300, the base station 200 may transmit information about a channel information providing method to the terminal 100.

The base station 200 according to an embodiment may transmit, to the terminal 100, information about a method of determining channel information for a plurality of services and a method of transmitting the determined channel information to the base station 200.

In operation S310, the base station 200 may transmit, to the terminal 100, a reference signal for measuring a channel status between the base station 200 and the terminal 100.

In operation S320, the base station 200 may receive the channel information for the plurality of services determined based on the information about the channel information providing method and the reference signal.

In operation S330, the base station 200 may determine the channel status between the base station 200 and the terminal 100, based on the received channel information.

Figure 4A:
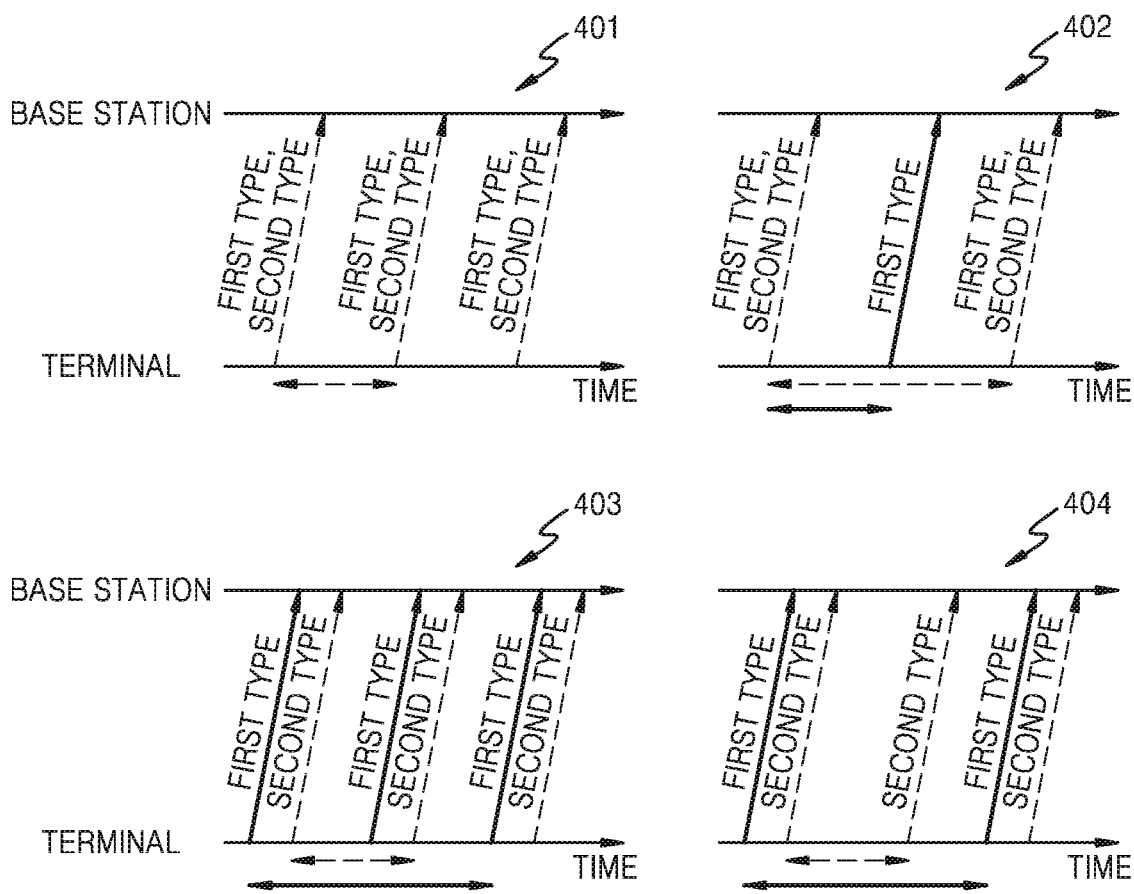
FIGS. 4A and 4B are diagrams for describing a method, performed by a terminal, of transmitting channel information of each service to a base station, according to embodiments.
Figure 4B:
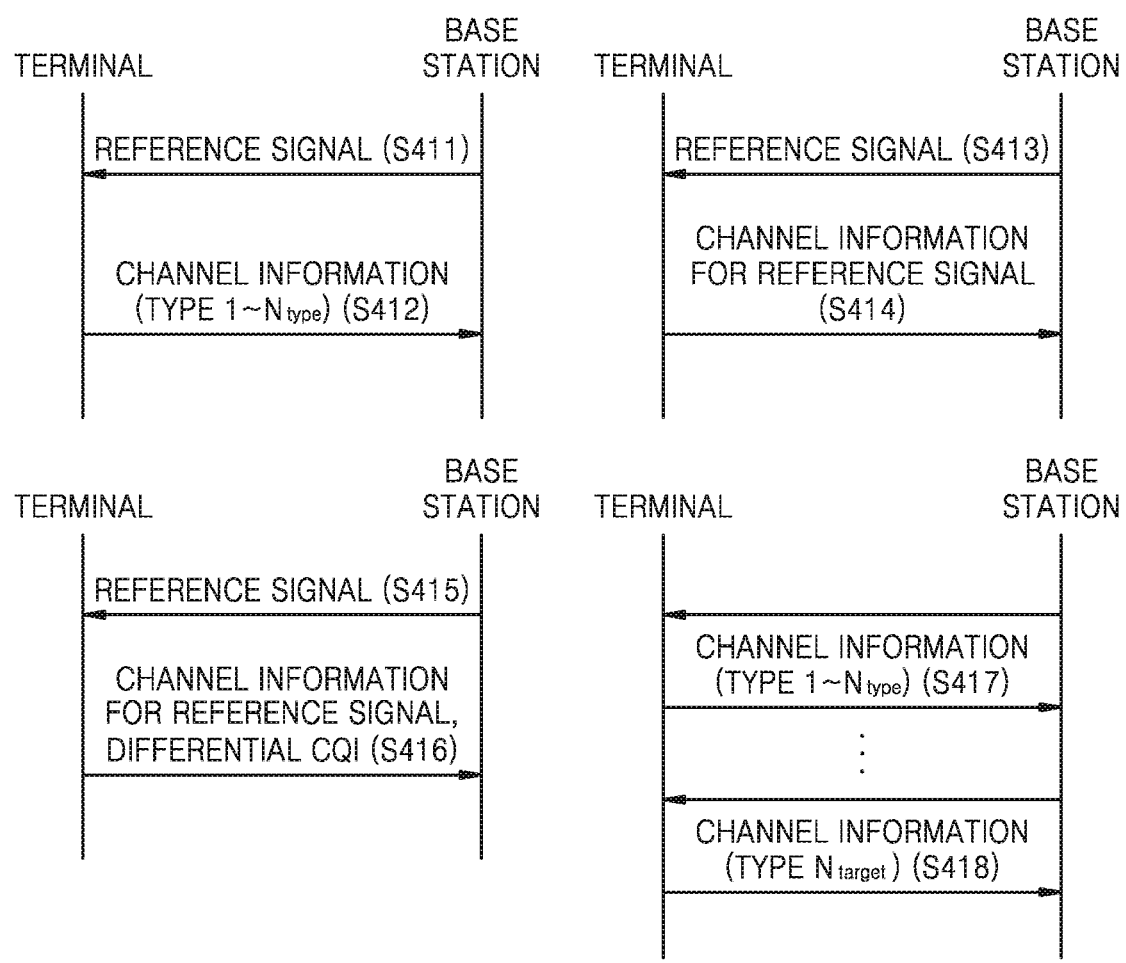

FIGS. 4A and 4B are diagrams for describing a method, performed by a terminal, of transmitting channel information of each service to a base station, according to embodiments.

The terminal 100 according to an embodiment may transmit channel information for each service to the base station 200 periodically or aperiodically. Also, the terminal 100 may transmit the channel information for each service to the base station 200 at a same time point or at different time points based on the services. Also, when the terminal 100 transmits the channel information for each service periodically, a transmission cycle may be configured differently for services.

The terminal 100 according to an embodiment may transmit the channel information to the base station 200 periodically or aperiodically, based on characteristics of a supported service.

When the terminal 100 transmits the channel information to the base station 200 periodically, the terminal 100 may support a service in which traffic occurs sporadically even when separate channel information is not transmitted. For example, a URLLC service is a service in which traffic occurs sporadically and requires low latency. Accordingly, when the terminal 100 transmits the channel information to the base station 200 aperiodically, latency may occur due to the transmission of the channel information and a low latency condition required by the URLLC service may not be satisfied.

On the other hand, in the case of a service that requires a high data rate, such as an eMBB service, the terminal 100 may transmit the channel information to the base station 200 aperiodically when necessary, and accordingly, the base station 200 may accurately and quickly determine a change in a channel status.

Also, according to an embodiment, when one terminal 100 operates in a plurality of services that need to satisfy different performance requirements, the terminal 100 may transmit the channel information to the base station 200 periodically, and transmit channel information for a certain service to the base station 200 aperiodically when necessary.

For example, when the terminal 100 transmits the channel information to the base station 200 periodically, the channel information for different service types may be transmitted at a same time point at same cycles. Also, according to an embodiment, the terminal 100 may transmit the pieces of channel information for different types of services by varying at least one of a transmission time point and a transmission cycle.

For example, referring to a reference numeral 401 of FIG. 4A, the terminal 100 may transmit, to the base station 200, channel information for a first type service and a second type service at a same time point. The terminal 100 may transmit, to the base station 200, the channel information for the first type service and the second type service, by using uplink signaling of the same time point.

Also, a transmission time point and transmission cycle of channel information for each service may be configured differently based on a characteristic of each service, a change in a channel status, and a traffic amount.

For example, referring to a reference numeral 402 of FIG. 4A, the transmission cycle of the channel information for the first type service may be shorter than the transmission cycle of the channel information for the second type service. The terminal 100 may transmit the channel information for the first type service and the second type service at the same time point and additionally transmit the channel information for the first type service. Also, referring to a reference numeral 403 of FIG. 4A, the terminal 100 may transmit the channel information for the first type service and the channel information for the second type service at different time points. Also, referring to a reference numeral 404 of FIG. 4A, the transmission time points and the transmission cycles of the channel information for the first type service and the channel information for the second type service may all be different.

The terminal 100 may transmit the channel information for each service via different uplink signaling when transmitting the channel information for each service at different time points. The transmission cycle of the channel information for each service may be determined based on the channel status and the traffic amount of service. For example, when the channel status changes quickly, the transmission cycle of the channel information may be shortened to quickly reflect the change in the channel status. However, when the change in the channel status is small, the transmission cycle of the channel information may be lengthened to reduce overhead occurred due to transmission of the channel information.

Also, in the case of a service in which traffic occurs relatively frequently, the transmission cycle of the channel information may be shortened to efficiently support the traffic with high occurrence frequency.

On the other hand, in the case of a service in which traffic occurs relatively less, the transmission cycle of the channel information may be lengthened to reduce the overhead occurred due to transmission of the channel information.

The transmission cycle of the channel information may be differently configured based on the characteristic of the service, in addition to the channel status and the traffic amount. For example, when high reliability is required like a URLLC service, the transmission cycle of the channel information may be relatively shortened such that performance requirements are satisfied. Accordingly, the terminal 100 may satisfy higher reliability because the channel information is transmitted to the base station 200 by quickly reflecting the change in the channel status. When the terminal 100 according to an embodiment operates in different types of services, a method of exchanging, with the base station 200, a control signal for transmitting and receiving channel information is required.

Referring to FIG. 4B, the terminal 100 according to an embodiment may transmit, to the base station 200, the channel information for each service at the same time point. The terminal 100 may transmit the channel information for different types of services at the same cycle.

For example, the terminal 100 may transmit channel information 412 for all supportable services to the base station 200, in response to a reference signal 411 received from the base station 200. $N_{type}$ may denote the number of all service types operable by the terminal 100. Also, according to an embodiment, the terminal 100 may transmit only channel information 413 about a reference service to the base station 200 and may not separately transmit channel information 414 about another service. According to another embodiment, the terminal 100 may transmit channel information 415 about a reference service to the base station 200 and transmit a differential CQI 416 indicating a difference between a CQI for the reference service and a CQI for another service to the base station 200.

According to another embodiment, the terminal 100 may transmit, to the base station 200, channel information for each service at different time points. For example, among a plurality of services, a transmission cycle of channel information for a $N_{target}$ type service may be shorter than that of another type of service. For example, the terminal 100 may transmit, to the base station 200, channel information 417 for all services in a first operation. Then, in a second operation, the terminal 100 may additionally transmit the channel information for the $N_{target}$ type service of which the transmission cycle is shorter than that of the channel information of the other type.

Also, when the channel information for supporting the plurality of services are transmitted from the terminal 100 to the base station 200, a channel information transmitting and receiving method discussed in the NR standardization may be used.

The channel information transmitting and receiving method discussed in the NR standardization may be distinguished into three operations including a channel information transmission configuring operation, a reference signal configuring operation, and a channel information measuring operation.

For example, the terminal 100 may receive one reference signal (for example, CSI-RS) from the base station 200 and transmit, to the base station 200, channel information measured based on the received reference signal. According to an embodiment, the terminal 100 may receive a plurality of reference signals from the base station 200 and transmit, to the base station 200, channel information measured based on the received plurality of reference signals. Also, according to another embodiment, the terminal 100 may measure channel information for a plurality of services, based on one received reference signal and transmit, to the base station 200, the measured channel information for the plurality of services.

Also, in NR, a reference signal may be assigned by using a synchronization signal (SS) block. A method of arranging a reference signal in an SS block that is a signal resource for synchronization is being currently discussed, and the terminal 100 may use the SS block when transmitting channel information to the base station 200.

Figure 5:
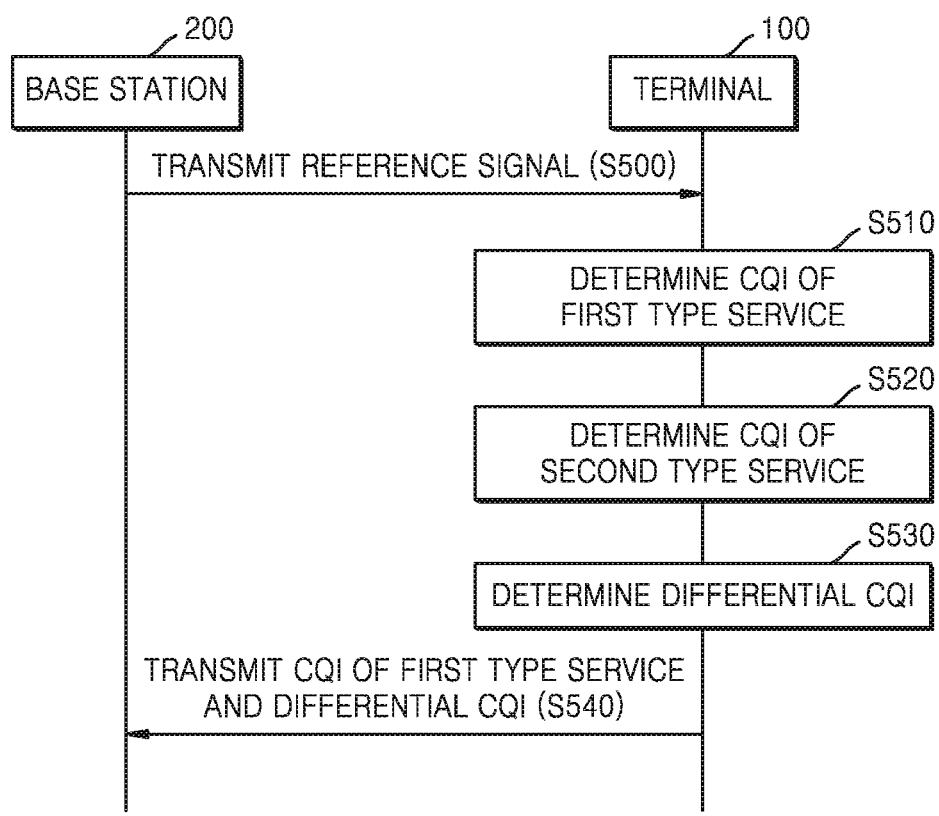
FIG. 5 is a flowchart for describing a method, performed by a terminal, of transmitting a channel quality indicator (CQI) to a base station, according to an embodiment.

FIG. 5 is a flowchart for describing a method, performed by a terminal, of transmitting a CQI to a base station, according to an embodiment.

Channel information may include at least one of CQI, PMI, and RI.

The CQI is information indicating a signal to interference and noise ratio (SISNR) for all or some bands of a wireless communication system, and may be referred to as a channel quality indicator or channel quality information, but is not limited thereto.

The CQI may include a modulation and coding scheme (MCS) and a transport block size (TBS), but is not limited thereto. For example, the CQI may be determined based on a pre-defined CQI table.

When one terminal 100 is operable in a plurality of services, the terminal 100 may select a CQI suitable for each service based on the pre-defined CQI table, and an MCS and TBS indicated by the selected CQI should be suitable for each service. A method by which the terminal 100 transmits a CQI varies based on a method of selecting the CQI.

The terminal 100 according to an embodiment may transmit a CQI for a reference service among a plurality of services by using a same method as exiting LTE, and configure a CQI for a service other than the reference service to a fixed value. The reference service may be configured as a most frequently used service among supportable services. For example, a plurality of services supported by a 5G communication system to the terminal 100 may include an eMBB service, a URLLC service, and an mMTC service. The eMBB service may be configured as the reference service, but is not limited thereto. Here, the terminal 100 may transmit, to the base station 200, a CQI for the eMBB service that is the reference service, by using the same method as the existing LTE, and configured the CQI for a service other than the reference service, such as the URLLC service and the mMTC service, to the fixed value. For example, the terminal 100 may configure the MCS and TBS for the service other than the reference service to fixed values, and configure the value to satisfy performance requirements of a service, such as reliability and data rate.

For example, because the URLLC service requires relatively high reliability and does not have a large traffic amount, the MCS for the URLLC service may be configured to a value lower than the MCS for the reference service (for example, the eMBB service). Also, because the URLLC service requires low latency and uses sTTI that reduces TTI to satisfy the performance requirements, the TBS for the URLLC service may be configured to a value lower than the TBS for the eMBB service. As described above, when the CQI for the service other than the reference service among the plurality of services is configured to the fixed value, the terminal 100 may not need to transmit the CQI for the other service to the base station 200. However, because a CQI reflecting a change in a channel status is not transmitted to the base station 200, the base station 200 may be unable to efficiently assign a resource to the terminal 100 considering the change in the channel status.

According to another embodiment, the terminal 100 may transmit, as CQIs for the plurality of services, the CQI for the reference service and differential CQIs determined based on differences between the CQI for the reference service and the CQIs for the other services.

Referring to FIG. 5, in operation S500, the base station 200 may transmit, to the terminal 100, a reference signal for measuring a channel status.

In operation S510, the terminal 100 may determine a CQI for a first type service, based on the reference signal received from the base station 200.

Also, in operation S520, the terminal 100 may determine a CQI for a second type service, based on the reference signal. For example, the terminal 100 may select CQIs for different types of services, such as an eMBB service and URLLC service, by using a pre-defined CQI table.

In operation S530, the terminal 100 may determine a differential CQI, based on a difference between the CQI for the first type service and the CQI for the second type service.

For example, the first type service may denote a reference service and the second type service may denote another service excluding the reference service among a plurality of services, but are not limited thereto. For example, among a plurality of services supported in a 5G communication system, the first type service may denote an eMBB service and the second type service may denote a URLLC service, but are not limited thereto. When the first type service is the eMBB service and the second type service is the URLLC service, because the URLLC service requires reliability relatively higher than that of the eMBB service, the CQI for the URLLC service may be determined to a value smaller than that of the CQI for the eMBB service. Accordingly, a differential CQI determined based on a difference between the CQI ($CQI_{eMBB}$) for the eMBB service and the CQI ($CQI_{URLLC}$) for the URLLC service is defined as $CQI_{eMBB}$-$CQI_{URLLC}$, and the differential CQI may have a positive value when transmission time points of the two CQIs are the same.

However, when the time points when the two CQIs are transmitted are different and a change in a channel status is relatively large, $CQI_{URLLC}$ may be greater than the selected $CQI_{eMBB}$. Accordingly, a differential CQI table for each service may be configured considering characteristics of a time point when a CQI of a service other than a CQI of a reference service is transmitted to the base station 200 and a relationship between the CQI for the reference service and the CQI for the other service. The differential CQI table may be configured based on the difference between the CQI for the reference service and the CQI for each service. When the differential CQI table is configured, the terminal 100 may select a CQI index corresponding to a current channel status from the configured differential CQI table and transmit the selected CQI index to the base station 200.

The terminal 100 according to an embodiment may transmit the CQI for each service to the base station 200 by using the differential CQI table determined based on the difference between the CQI for the reference service and the CQI for the other service. For example, the terminal 100 may transmit a differential CQI index for the other service excluding the reference service to the base station 200 together with a CQI index for the reference service. Accordingly, overhead occurred due to transmission of channel information may be reduced compared to when all CQI indexes for the services are transmitted.

Figure 6:
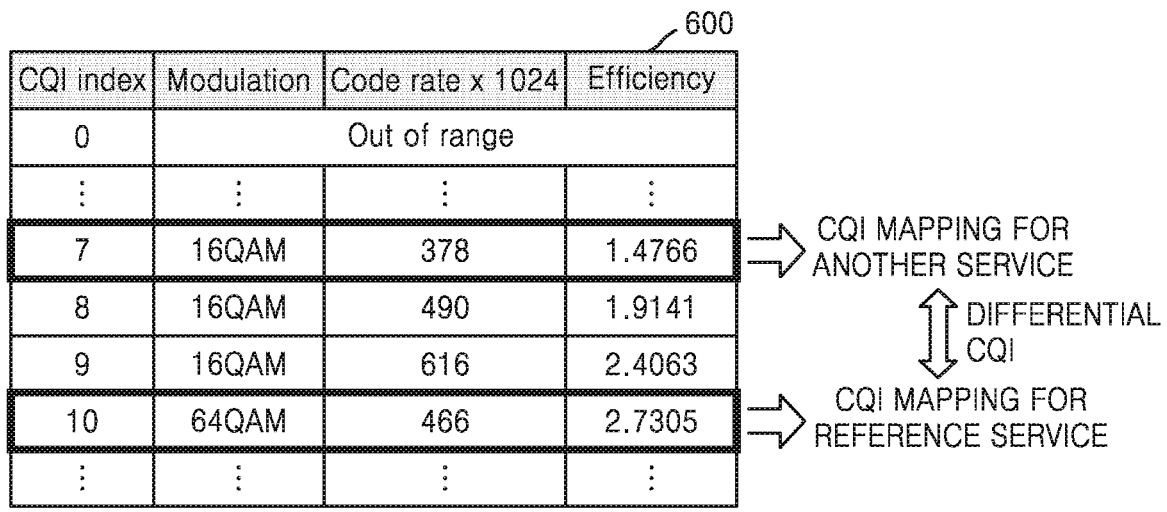
FIG. 6 is a diagram for describing a method of determining a differential CQI, according to an embodiment.

FIG. 6 is a diagram for describing a method of determining a differential CQI, according to an embodiment.

Referring to FIG. 6, a CQI table 600 may include information about a CQI index, a modulation method, a code rate, and transmission efficiency, and when a value of the CQI index increases, the quality of a channel status may be increased.

The terminal 100 according to an embodiment may determine a CQI for a reference service and a CQI for another service, based on the CQI table 600. For example, as shown in FIG. 6, the terminal 100 may select a CQI index value 10 as the CQI for the reference service and a CQI index value 7 as the CQI for the other service.

Also, the terminal 100 may determine a differential CQI based on a difference between the CQI for the reference service and the CQI for the other service. For example, referring to FIG. 6, when a CQI index value for the reference service is 10 and a CQI index value for the other service is 7, a differential CQI index may be 3.

The terminal 100 according to an embodiment may transmit, as a channel CQI for a service other than a reference service, a CQI index for the reference service and a differential CQI index determined based on a CQI for the reference service and a CQI for the other service.

Figure 7:
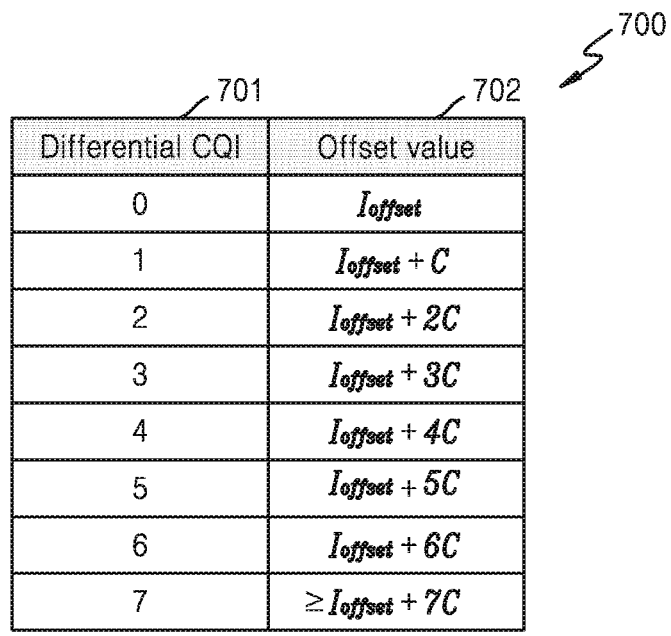
FIG. 7 is a diagram for describing a differential CQI table according to an embodiment.

FIG. 7 is a diagram for describing a differential CQI table according to an embodiment.

As described above, channel information including CQI may be transmitted to the base station 200 at a same time point for each service, and according to an embodiment, channel information for each service may be transmitted to the base station 200 at different time points. For example, in a 5G communication system supporting a plurality of services including an eMBB service and a URLLC service, channel information for each service may be transmitted to a base station at a same time point. Here, because the URLLC service requires higher reliability than the eMBB service, CQI for the URLLC service may have a smaller value than CQI for the eMBB service.

Referring to FIG. 7, a differential CQI table 700 may include a field 701 indicating a differential CQI index and a field 702 indicating an offset value, but is not limited thereto.

The differential CQI table 700 shown in FIG. 7 indicates a case in which CQI ($CQI_{eMBB}$) for a URLLC service and CQI ($CQI_{URLLC}$) for an eMBB service are transmitted to the base station 200 at a same time point, and $CQI_{eMBB}$ and $CQI_{URLLC}$ may both have a value equal to or greater than 0. $I_{offset}$ that is an offset of differential CQI may be determined based on a difference of performance requirements between the URLLC service and the eMBB service, and may denote differential CQI when a difference between COI for the URLLC service and CQI for the eMBB service is the smallest.

c denotes a difference value between differential CQI indexes and is a positive value. The differential CQI table 700 shown in FIG. 7 shows a case when the differential CQI is 3 bits, and when a bit number of the differential CQI is decreased, overhead occurred due to transmission of channel information may be decreased.

FIG. 8 is a diagram for describing a CQI table for each service, according to an embodiment.

Unlike as shown in FIGS. 5 through 7, according to an embodiment, CQI tables for each of a plurality of services may be configured.

For example, when the terminal 100 operates in both an eMBB service and a URLLC service, CQI tables for the each of eMBB service and the URLLC service may be configured. The CQI table for the eMBB service may be designed such that a high data rate is secured by improving spectral efficiency. However, because the URLLC service requires relatively higher reliability than the eMBB service, the CQI table for the URLLC service may be designed to be more focused on improving reliability rather than the spectral efficiency.

Referring to FIG. 8, in a CQI table 800 for an eMBB service, a CQI index includes 4 bits and a modulation method having various modulation orders, such as QPSK, 16 QAM, and 64 QAM may be used based on a channel status. However, a URLLC service requires higher reliability than the eMBB service. Thus, a CQI table 810 for the URLLC service may be configured such that a modulation method having a high modulation order is not supported but only a modulation method having a relatively low modulation order is supported. For example, referring to FIG. 8, the CQI table 810 for the URLLC service may be configured to support only a modulation method having a relatively low modulation order, such as QPSK and 16 QAM, excluding a modulation method having a high modulation order, such as 64 QAM, but is not limited thereto. Also, because a channel status is satisfactory when a CQI index value is high, transmission efficiency in the CQI table 810 for the URLLC service may be high when the CQI index value is high.

Also, referring to FIG. 7, a CQI index of the CQI table 810 for the URLLC service is 3 bits and a CQI index of the CQI table 800 for the eMBB service is 4 bits. Accordingly, by configuring a CQI table excluding a modulation method having a high modulation order, the number of bits required to transmit a CQI to the base station 200 may be reduced.

Also, in the CQI tables 800 and 810, the transmission efficiency may be determined considering performance requirements of each service. For example, in the CQI table 810 for the URLLC service, the transmission efficiency may be determined considering a reliability condition required in the URLLC service. Referring to the CQI table 810 for the URLLC service, values sequentially increasing from to $\alpha_1$ to $\alpha_7$ may be selected for a size of the transmission efficiency.

FIG. 9 is a diagram for describing a method of differently configuring a size of a transport block for each service, according to an embodiment.

According to an embodiment, CQI tables for each of a plurality of services may be configured and TBS tables for each of the plurality of services may be configured. For example, in a URLLC service requiring low latency, a terminal may be supported by using sTTI. Here, by using sTTI, the number of resources available for 1 TTI may be reduced. When the number of resources available for 1 TTI is reduced, it may not be suitable to support the URLLC service by using a TBS table for an eMBB service. Thus, the terminal 100 may define a TBS table suitable for an sTTI frame structure using 7 operating system (OS), ¾ OS, and 2 OS, and use a TBS table defined for the URLLC service.

Referring to FIG. 8, a pre-defined TBS table 900 and an additionally defined TBS table 910 to support the URLLC service are shown. The additionally defined TBS table 910 may be defined according to each of 7 OS, ¾ OS, and 2 OS, and values included in the TBS table 910 may be determined by using Equation 1 below, but is not limited thereto.

$$\alpha(10,21)<3752, \alpha(10,22)<3880, \alpha(10,23)<4008, \ldots \\ \alpha(11,21)<4264, \alpha(11,22)<4392, \alpha(11,21)< \\ 4584, \ldots \ldots <\alpha(11,21)<\alpha(11,22)<\alpha \\ (11,23)< \ldots \ldots \alpha(10,21)<\alpha(11,21)<\alpha( \\ 12,21)< \ldots$$

[Equation 1]

Like the pre-defined TBS table 900, the additionally defined TBS table 910 may also be configured such that a TBS value increases as a physical resource block (PRB) index and a TBS index are increased. However, when sTTI is used like the URLLC service, a TTI may be decreased and thus the number of resources in one PRB may be decreased. Here, compared to the pre-defined TBS table 900, the additionally defined TBS table 910 may be configured to have a value smaller than the pre-defined TBS table 900 when PRB size and TBS indexes are the same.

FIG. 10 is a diagram for describing an integrated CQI table, according to an embodiment.

When a wireless communication system according to an embodiment supports a plurality of services, the terminal 100 may newly define an integrated CQI table distinguished from a pre-defined CQI table and use the integrated CQI table. The integrated CQI table includes values capable of satisfying performance requirements of a plurality of services of different types, and may have a size larger than an existing CQI table.

The integrated CQI table according to an embodiment may be configured in a form to which values considering a service supported by NR are added while including all values of the pre-determined CQI table. Alternatively, according to an embodiment, the integrated CQI table may be configured as values all different from the values included in the pre-defined CQI table are selected. Alternatively, the integrated CQI table may be configured by using some of the values included in the pre-defined CQI table and selecting new values for remaining values.

When CQI is transmitted to the base station 200 by using one integrated CQI table, the terminal 100 may extract a CQI subset table including CQI indexes for a corresponding service from the CQI table according to a service type. Also, the terminal 100 may determine a CQI subset index for the corresponding service based on the extracted CQI subset table and transmit the determined CQI subset index to the base station 200.

Referring to FIG. 10, when the base station 200 supports the terminal 100 with a first type service, the terminal 100 may configured, from an integrated CQI table, 1 to 3 and 11 to 14 corresponding to COI indexes for the first type service as one CQI subset table 1010. Also, the terminal 100 may select, from the configured CQI subset table 1010, a subset CQI index best reflecting a channel status as a CQI for the first type service, and transmit the selected subset CQI index to the base station 200.

Like the first type service, for a second type service, the terminal 100 may configure a CQI subset table based on 3 to 7, 15 and 16, and 20 to 27 corresponding to CQI indexes for the second type service. Then, the terminal 100 may select one CQI subset index from the configured COI subset table and transmit the CQI subset index to the base station 200. For a third type service, a CQI subset table may be configured in the same manner as the first type service and the second type service, and the terminal 100 may transmit a CQI subset index for the third type service to the base station 200 based on the configured CQI subset table.

Referring to FIG. 10, to $\alpha_1$ to $\alpha_{31}$ each denotes transmission efficiency for each CQI and a relationship between sizes of transmission efficiencies is as follows.

$$\alpha_1 < \alpha_2 < \ldots < \alpha_{30} < \alpha_{31}$$ [Equation 2]

As described above, when the terminal 100 transmits CQI for each service to the base station 200, the terminal 100 may transmit, to the base station 200, CQI for a reference service and differential CQI indicating a difference between the CQI for the reference service and CQI for another type of service.

Alternatively, according to an embodiment, the terminal 100 may transmit only the CQI for the reference service and not transmit the CQI for the other type of service. For example, the terminal 100 may transmit only the CQI for the reference service to the base station 200 and estimate the CQI for the other service by using the CQI for the reference service.

To estimate the CQI for the other service by using the CQI for the reference service, a correlation between the CQI for the reference service and the CQI for the other service may be pre-defined, and the correlation between the CQI for the reference service and the CQI for the other service may be defined by a function according to a difference of performance requirements between services, but is not limited thereto.

The base station 200 according to an embodiment may estimate the CQI for the other service by using the CQI for the reference service received from the terminal 100. When the terminal 100 operates in the reference service, the base station 200 may perform downlink scheduling based on the CQI for the reference service received from the terminal 100. Also, when the terminal 100 operates in the other service instead of the reference service, the base station 200 may estimate the CQI for the other service based on the CQI for the reference service and perform downlink scheduling based on an estimated value of the CQI for the other service.

As described above, channel information may include CQI, CRI, PMI, and RI, and CRI, PMI, and RI may be required among the channel information to support MIMO preceding. To support a plurality of services of different types, the terminal 100 may transmit same CRI, PMI, and RI to the base station 200 for all services or transmit CRI, PMI, and RI suitable for each service to the base station 200. When the same CRI, PMI, and RI are transmitted for all services, overhead caused by additionally transmitting the channel information does not occur but performance may deteriorate other than the reference service. Also, when the terminal 100 transmits the CRI, PMI, and RI suitable for each service to the base station 200, the overhead caused by additionally transmitting the channel information may be relatively large.

To transmit the PMI for each service, the terminal 100 may select the PMI suitable for each service by using a new codebook capable of satisfying performance requirements of each service, and transmit the selected PMI to the base station 200.

Also, the terminal 100 may transmit the RI for each service. When the terminal 100 operates in a service requiring high reliability like a URLLC service, the terminal 100 may limit a rank value according to a CQI value transmitted to the base station 200. In an environment where a channel status is not satisfactory, a value of a CQI index received from the terminal 100 may be very small, and thus when the base station 200 supports a relatively high rank, it may be difficult to guarantee high reliability. Accordingly, in the service that requires relatively high reliability, the terminal 100 may configure the rank value to be smaller than or equal to a pre-configured value, based on the value of the CQI index. For example, when the value of the CQI index is smaller than a threshold value, the terminal 100 may fix the rank to the pre-configured value. For example, in the service that requires the relatively high reliability like the URLLC service, the terminal 100 may configure the rank value to 1 to guarantee high reliability, but is not limited thereto. For example, when CQI for the URLLC service is smaller than a pre-configured threshold value, the terminal 100 may configure a rank to 1 and omit a process for transmitting a separate RI.

Figure 11:
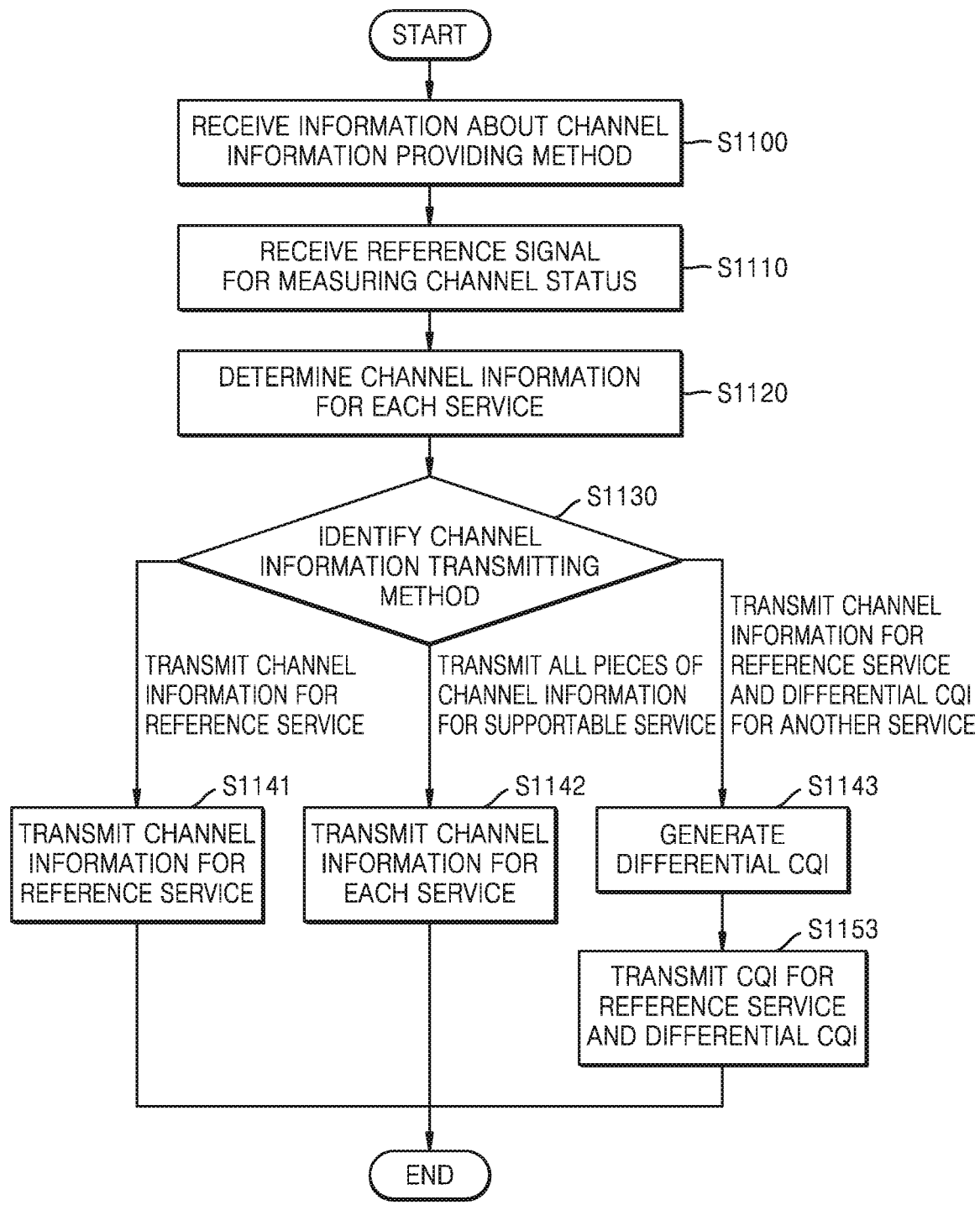
FIG. 11 is a flowchart showing processes of transmitting and receiving channel information between a terminal and a base station.

FIG. 11 is a flowchart showing processes of transmitting and receiving channel information between a terminal and a base station.

In operation S1100, the terminal 100 may receive information about a channel information providing method for a plurality of services of different types, from the base station 200.

In operation S1110, the terminal 100 may receive, from the base station 200, a reference signal for measuring a channel status.

In operation S1120, the terminal 100 may determine channel information for each service. As described above, the terminal 100 may select CQI for each service based on a CQI table and determine CRI, PMI, and RI for each service to support MIMO preceding, but is not limited thereto.

In operation S1130, the terminal 100 may identify a method of transmitting the channel information, based on the information about the channel information providing method.

For example, when it is configured to transmit only channel information for a reference service, the terminal 100 may transmit the channel information for the reference service to the base station 200 (operation S1141). Here, the base station 200 may estimate channel information for another service, based on the received channel information about the reference service.

According to an embodiment, when it is configured to transmit channel information for all supportable services, the terminal 100 may transmit channel information for each service to the base station 200 (operation S1142).

According to another embodiment, when it is configured to transmit differential CQI regarding the CQI for the reference service and the CQI for the other service, the terminal 100 may generate the differential CQI based on a difference between the CQI for the reference service and the CQI for the other service (operation S1143), and transmit the differential CQI regarding the COI for the reference service and the CQI for the other service as the channel information (operation S1153).

Figure 12:
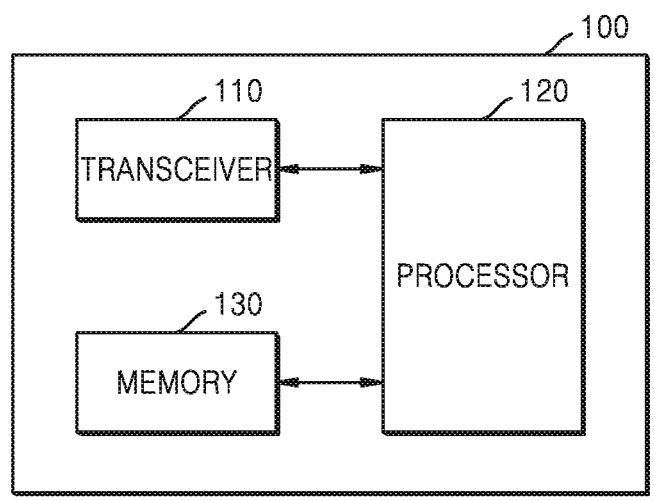
FIG. 12 is a block diagram showing a configuration of a terminal, according to an embodiment.

FIG. 12 is a block diagram showing a configuration of a terminal, according to an embodiment.

Referring to FIG. 12, the terminal 100 may include a transceiver 110, a processor 120, and a memory 130, but is not limited thereto. According to another embodiment, the terminal 100 may include more components than those described above, and the transceiver 110, the processor 120, and the memory 130 may be implemented in a form of one chip.

The transceiver 110 may transmit and receive signals including information with a base station. Here, the information may include information about a channel information generating method and channel information. In this regard, the transceiver 110 may include a RF transmitter for up-converting and amplifying a frequency of a transmitted signal, and a RF receiver for amplifying low-noise and down-converting a frequency of a received signal. However, this is only an embodiment and components of the transceiver 110 are not limited to the RF transmitter and the RF receiver.

Also, the transceiver 110 may receive and output, to the processor 120, a signal through a wireless channel, and transmit a signal output from the processor 120 through the wireless channel.

The processor 120 may control a series of processes such that the terminal 100 operates as described above. For example, the processor 120 may generate channel information about a plurality of services, according to information about a channel information providing method received from the base station through the transceiver 110.

The memory 130 may store the information about the channel information providing method, the channel information, control information, or data included in the signal obtained by the terminal 100, and may include an area for storing data required for control of the processor 120 and data generated during control of the processor. The memory 130 may be implemented in various forms, such as read-only memory (ROM) and/or random access memory (RAM) and/or hard disk and/or CD-ROM and/or DVD.

Figure 13:
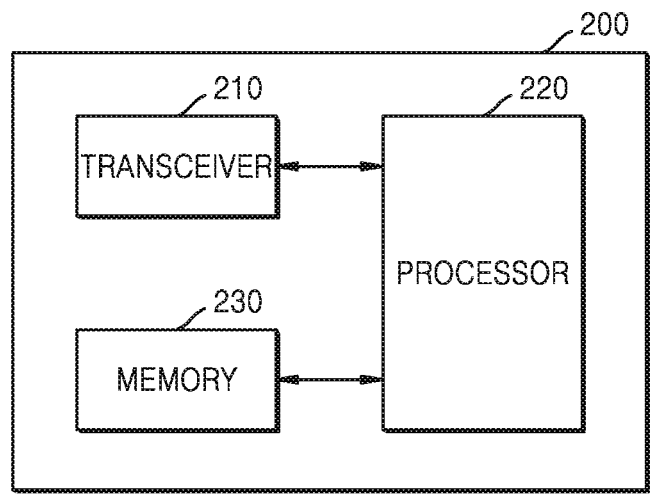
FIG. 13 is a block diagram showing a configuration of a base station, according to an embodiment.

FIG. 13 is a block diagram showing a configuration of a base station, according to an embodiment.

Referring to the FIG. 13, the base station 200 may include a transceiver 210, a processor 220, and a memory 230. The transceiver 210, the processor 220, and the memory 230 of the base station 200 may operate according to a method of transmitting and receiving channel information proposed in the above embodiments. However, components of the base station 200 according to an embodiment are not limited to the above example. According to another embodiment, the base station 200 may include more components than those described above. Also, the transceiver 210, the processor 220, and the memory 230 of the base station 200 may be implemented in a form of one chip.

The transceiver 210 according to an embodiment may transmit and receive signals with the terminal 100. Here, the signal may include information about a channel information providing method and channel information. In this regard, the transceiver 210 may include a RF transmitter for up-converting and amplifying a frequency of a transmitted signal, and a RF receiver for amplifying low-noise and down-converting a frequency of a received signal. However, this is only an embodiment and components of the transceiver 210 are not limited to the RF transmitter and the RF receiver.

Also, the transceiver 210 may receive and output, to the processor 220, a signal through a wireless channel, and transmit a signal output from the processor 220 through the wireless channel.

The processor 220 according to an embodiment may control a series of processes such that the base station 200 operates as described above. For example, the processor 220 may determine a channel status between the base station 200 and the terminal 100, based on the channel information received from the terminal 100.

The memory 230 according to an embodiment may store the information about the channel information providing method, the channel information, control information, or data, and may include an area for storing data required for control of the processor 220 and data generated during control of the processor 220. The memory 230 may be implemented in various forms, such as ROM and/or RAM and/or hard disk and/or CD-ROM and/or DVD.

Meanwhile, a computer-readable storage medium that may be a computer-readable storage medium included in a base station or terminal as described above is provided, or the computer-readable storage medium exists individually rather than fit to an arbitrary end. There is one or more computer programs stored on a computer-readable storage medium, and at least one processor executes one or more computer programs to perform communication using a preamble.

The embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. In addition, the above embodiments are divided for convenience of description, and may be combined and operated as necessary.

The invention claimed is:

1. A method, performed by a terminal, of transmitting and receiving channel information in a wireless communication system, the method comprising:
  receiving information about a channel information providing method from a base station;
  receiving, from the base station, a reference signal for measuring a channel status between the base station and the terminal;
  determining a channel quality indicator (CQI) for a first type service and a CQI for a second type service among a plurality of services based on the received reference signal, in case that the information about the channel information providing method includes information indicating transmission of a differential CQI for the plurality of services;

determining a differential CQI indicating a difference
between the CQI for the first type service and the CQI
for the second type service based on a predetermined
differential CQI table; and
transmitting, to the base station, the channel information
for the plurality of services including the differential
CQI.

2. The method of claim 1, wherein determining the CQI for the first type service and the CQI for the second type service comprises:
determining the CQI for the first type service and the CQI for the second type service among the plurality of services, based on a CQI table.

3. The method of claim 1, in case that the information about the channel information providing method includes information indicating transmission of channel information for each of the plurality of services, the method further comprises:
extracting a plurality of CQI subset tables including a CQI index for each of the plurality of services, based on a CQI table including CQI indexes for the plurality of services;
configuring a CQI subset index for each of the plurality of services, based on the extracted plurality of CQI subset tables; and
transmitting the channel information including CQI subset index for each of the plurality of services to the base station.

4. The method of claim 1, wherein transmitting the channel information for the plurality of services comprises transmitting, to the base station, service identification information for identifying the first type service and the second type service.

5. The method of claim 1, the method further comprises:
determining the channel information for the plurality of services comprises, in case that the second type service is a service requiring higher reliability than the first type service, configuring a rank value for the second type service to be equal to or smaller than a preconfigured value, based on a CQI for the second type service.

6. A method, performed by a base station, of transmitting and receiving channel information in a wireless communication system, the method comprising:
transmitting information about a channel information providing method to a terminal;
transmitting, to the terminal, a reference signal for measuring a channel status between the base station and the terminal;
receiving, from the terminal, channel information for a plurality of services including a differential channel quality indicator (CQI) for the plurality of services indicating a difference between a CQI for a second type service among a plurality of services, in case that the information about the channel information providing method includes information indicating transmission of the differential CQI for the plurality of services; and
determining the channel status between the base station and the terminal, based on the received channel information for the plurality of services,
wherein the CQI for the first type service and the CQI for the second type service are determined based on the received reference signal at the terminal, and
the differential CQI is determined based on a differential CQI table predetermined at the terminal.

7. The method of claim 6, wherein the CQI for the first type service and the CQI for the second type service are determined based on a CQI table.

8. The method of claim 6, the method further comprises:
receiving the channel information including CQI subset index for each of the plurality of services from the terminal in case that the information about the channel information providing method includes information indicating transmission of channel information for each of the plurality of services,
wherein a plurality of CQI subset tables including a CQI index for each of the plurality of services are extracted based on the CQI table including CQI indexes for the plurality of services, and
the CQI subset index for each of the plurality of services is configured based on the extracted plurality of CQI subset tables.

9. The method of claim 6, wherein receiving the channel information for the plurality of services comprises receiving, from the terminal, service identification information for identifying the first type service and the second type service.

10. A terminal for transmitting and receiving channel information in a wireless communication system, the terminal comprising:
a transceiver; and
at least one processor,
wherein the at least one processor is configured to:
receive, from a base station, information about a channel information providing method and receive, from the base station, a reference signal for measuring a channel status between the base station and the terminal, by using the transceiver;
determine a channel quality indicator (CQI) for a first type service and a CQI for a second type service among a plurality of services based on the received reference signal, in case that the information about the channel information providing method includes information indicating transmission of a differential CQI for the plurality of services,
determine a differential CQI indicating a difference between the CQI for the first type service and the CQI for the second type service based on a predetermined differential CQI table, and
transmit, to the base station, the channel information for the plurality of services including the differential CQI, by using the transceiver.

11. A base station for transmitting and receiving channel information in a wireless communication system, the base station comprising:
a transceiver; and
at least one processor,
wherein the at least one processor configured to:
transmit, to a terminal, information about the channel information providing method and a reference signal for measuring a channel status between the base station and the terminal, by using the transceiver,
receive, from the terminal, channel information for a plurality of services including a differential channel quality indicator (CQI) for the plurality of services indicating a difference between a CQI for a second type service among a plurality of services in case that the information about the channel information providing method includes information indicating transmission of the differential CQI for the plurality of services, by using the transceiver, and determine the channel status between the base station and the terminal, based on the received channel information, wherein the CQI for the first type service and the CQI for the second type service are determined based on the received reference signal at the terminal, and wherein the differential CQI is determined based on a differential CQI table predetermined at the terminal.

12. The base station of claim 11, wherein the CQI for the first type service and the CQI for the second type service are determined based on a CQI table.

13. The base station of claim 11, wherein the at least one processor is further configured to receive, from the terminal, service identification information for identifying the first type service and the second type service.

* * * * *